United States Patent [19]

Buzetzki

[11] Patent Number: 5,728,914

[45] Date of Patent: Mar. 17, 1998

[54] METHOD AND APPARATUS FOR DISPOSING OF ORGANIC HALOGEN COMPOUNDS

[75] Inventor: Eduard Buzetzki, Wolkaprodersdorf, Austria

[73] Assignee: Franz Howorka, Vienna, Austria

[21] Appl. No.: 606,049

[22] Filed: Feb. 23, 1996

[30] Foreign Application Priority Data

Mar. 8, 1995 [AT] Austria .................... A402/95

[51] Int. Cl.[6] ............................. B01D 61/44

[52] U.S. Cl. ............ 588/204; 204/530; 204/541; 204/543; 204/157.63; 204/157.64; 588/210; 588/212; 588/227

[58] Field of Search ................. 204/530, 541, 204/543, 157.63, 157.64; 588/204, 210, 212, 227

[56] References Cited

U.S. PATENT DOCUMENTS 5,116,509  5/1992  White ........................... 204/530

OTHER PUBLICATIONS

Podzorova, "New developments in radiation–chemical technology of sewage treatment" (1995) no month Abstract only.

Primary Examiner—Arun S. Phasge
Attorney, Agent, or Firm—Collard & Roe, P.C.

[57] ABSTRACT

A method and integrated apparatus for disposing of an organic halogen compound comprising phosphorus and at least one element selected from the group consisting of sulfur and a metal, in addition to carbon, hydrogen and oxygen, in atomic bond, comprises the steps of ionizing the compound to obtain ionization products, splitting up the ionization products by electrodialysis to obtain ionic end products and residual organic substances, and disposing of the ionic end products and residual organic substances.

23 Claims, 3 Drawing Sheets

METHOD AND APPARATUS FOR DISPOSING OF ORGANIC HALOGEN COMPOUNDS

FIELD OF THE INVENTION

The present invention relates to a method for disposing of organic compounds which in addition to the elements of carbon, hydrogen and oxygen comprise halogen, phosphorus, sulfur and/or metal elements in atomic bond, and to an apparatus to carry out the method.

Substances comprising halogen, phosphorus, sulphur as well as metal atoms such as mercury, arsenic and the like are used in a large variety of applications. They can be used as cooling agents, aerosol propellants, pesticides, medicaments, transformer oils and the like. A particularly critical field in this connection are chemical warfare agents. In all such cases there exists, among others, the problem of disposal of these frequently highly hazardous toxic compounds. In this respect it is necessary to destroy production waste, stocked goods, products which may be prohibited by statutory regulations after their production, consumer waste and the like.

A frequent approach in this respect is disposal by incineration. Organic compounds which only contain carbon, hydrogen and oxygen can be incinerated without any problems into carbon dioxide and water in the event of sufficient supply of oxygen. Particularly where halogen compounds are involved, however, it was noted that the formation of dangerous dioxines occurring during the incineration constituted a hindrance for this kind of neutralization.

SUMMARY OF THE INVENTION

It is an object of this invention to provide a low-risk method for destroying, neutralizing and disposing of such substances.

The present invention is based on the knowledge that electrically charged ions or molecule parts can be separated from one another by electrodialysis. In organic compounds with atomic (i.e. non-polar) bond of the interfering elements such a separation is only possible if this bond is polarized and is brought into a condition where it can be split up by electric energy.

Thus the invention purpose to subject the organic compounds to be disposed to an ionization, whereupon the arising charge-carrying ionization products are split up by electrodialysis and the ionic end products as well as the remaining organic substances are used or disposed in landfills or by incineration.

The ionization can be carried out under the influence of ionizing radiation.

In this process the atomic bonds are polarized, the substances to be disposed of are broken up into ionic products and the separation of the differently charged particles can be carried out under the influence of electric energy. As soon as the elements which originally are bound to each other by atomic bonds are present in ionic form they can be handled easier and be disposed of easily or be used for other purposes. In this way there is a neutralization of the hazardous compounds without having to take any risks which arose formerly in thermal destruction.

In this way pest control agents such as pesticides, herbicides, fungicides as well as halogenated hydrocarbons, chlorinated transformer oils, medicaments or chemical war agents are disposed of in an advantageous manner.

The method has proved to be particularly advantageous for organic halogen compounds, in particular such where the halogen is bonded to an aromatic ring, preferably a phenyl ring.

For example, this includes benzene derivatives substituted by chlorine, bromine and/or iodine which preferably are substituted by one or several hydroxyl, cyanide, alkyl or optionally esterified carboxyl or carboxyalkene groups.

Practical examples are dibromo- or diiodo-hydroxybenzoic nitrile and chlorotolyl-2-oxopropanoic acid. A combination of these substances is used in agriculture as herbicide with the name ANITEN®.

The method in accordance with the invention can also be used for halogenated polyphenyls, preferably polyhalogenated biphenyl (PCB), which is used as transformer oil.

Disposal problems are also encountered in aliphatic halogenated hydrocarbons (CFCs), which are used as cooling agents and aerosol propellants. Their disposal is also an object of the present invention.

The ionization of the compounds to be disposed of can be carried out by X-rays, optionally in combination with beta and/or gamma rays.

In the simplest form a common X-ray apparatus is used for this purpose, in which the aluminium plates inserted for the undesirable beta and gamma radiation are removed.

The substance to be disposed of is preferably present in liquid condition, in particular in the form of a solution, preferably as an aqueous solution.

Preferably, the ionization and the dialysis device are closely spaced, because the life of the arising ionized products, particularly where ionization with radiation is concerned, is often relatively short.

The ionization should produce a minimum conductivity of the solution of 500 µS (micromho) in order to achieve the desired effect.

BRIEF DESCRIPTION OF THE DRAWING

The subject of the present invention is also an apparatus for carrying out the method.

The apparatus is illustrated in the accompanying reference to the enclosed drawing, wherein.

DETAILED DESCRIPTION OF THE PREFERRED EMBODIMENT

Figure 1:
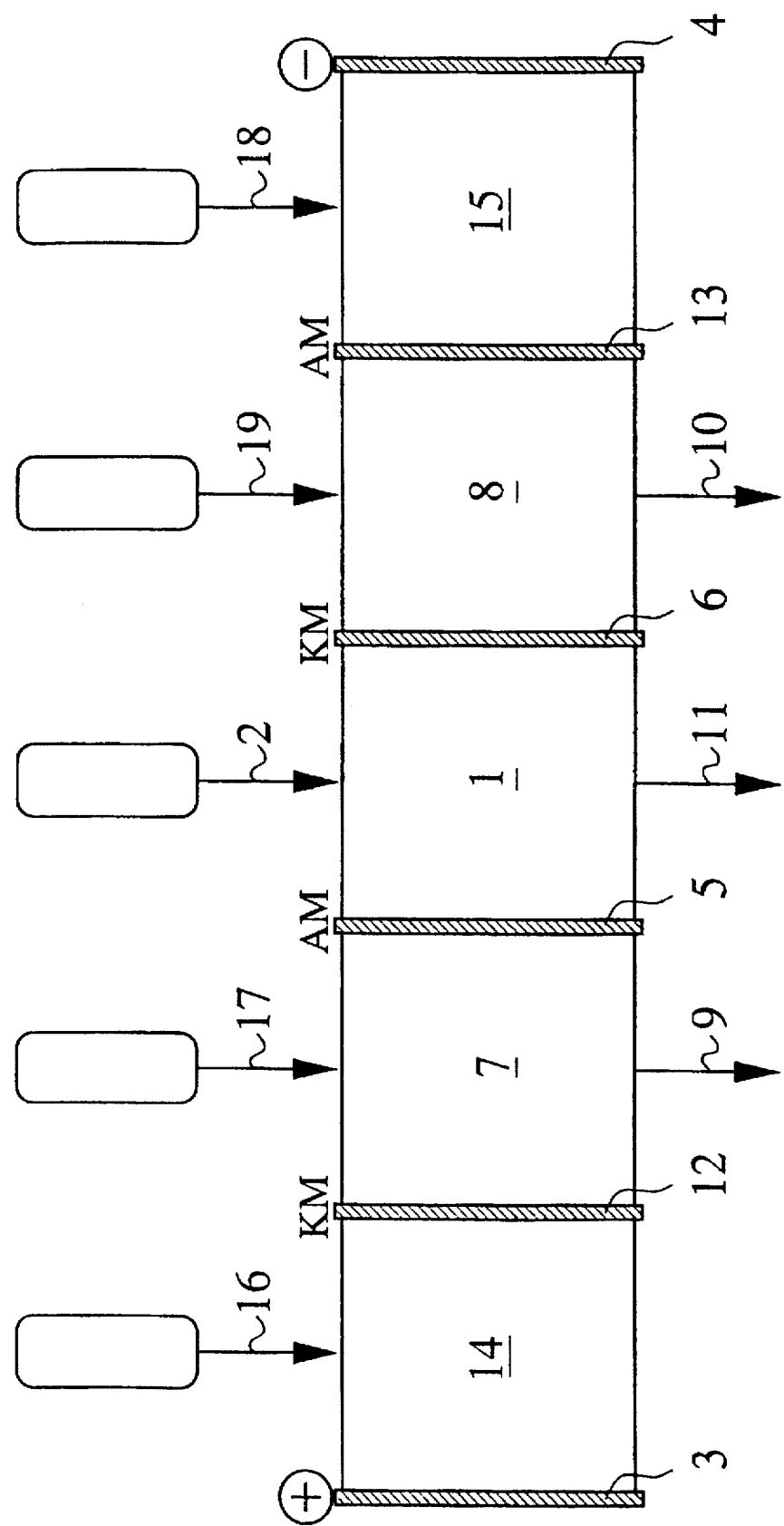
FIG. 1 shows the preferred ionization dialysis device for carrying out the method.

FIG. 1 shows a preferred multi-chamber installation which comprises the following components:

A central chamber 1 in which the raw solution is introduced through a supply line 2; ionization takes place in chamber 1. The ionization preferably occurs under the influence of ionizing radiation. Direct current is applied via anode 3 and cathode 4 and as a result of its influence the separation of the ionized components occurs. Central chamber 1 is adjacent to anolyte chamber 7 and catholyte chamber 8 which are separated from the central chamber by membranes 5 and 6, respectively. The drag-out is drawn off as concentrate from chambers 7 and 8 via discharge lines 9 and 10.

Organic material which remains in chamber 1 after the ionization and cannot diffuse away through membranes 5, 6 is discharged from said chamber through discharge line 11 as diluate.

The anolyte chamber 7 and the catholyte chamber 8 are adjacent to anode chamber 14 and cathode chamber 15 which are separated by membranes 12 and 13, respectively, and are supplied through feed lines 16 and 18 with a caustic or saline solution for establishing a store of ions.

Anolyte chamber 7 and catholyte chamber 8 are also supplied with caustic or saline solutions, i.e. ions, via feed lines 17 and 19; preferably, the supply of approx. 1 weight percent NaOH occurs via both lines 17 and 19.

Membranes 5 and 13 constitute anion permeable membranes AM and membranes 6 and 12 constitute cation permeable membranes KM.

The use of bipolar membranes is within the knowledge of an average man skilled in the art of electrodialysis.

One of the preferred embodiments of the present invention is the method of rendering harmless the herbicide ANITEN®, which consists of a mixture of 2-(4-chloro-o-tolyloxy)propanoic acid, 3,5-diiodo-4-hydroxybenzoic nitrile and 3,5-dibromo-4-hydroxybenzoic nitrile in a weight ratio of 5:1:1. The central chamber 1 is supplied with an aqueous solution of this substance mixture with a concentration of approx. 525 g/l.

Ionization is achieved in the simplest possible way with the help of a device which corresponds to an X-ray apparatus for originally medical purposes whose aluminium plates used for radiation shielding were removed.

It is understood that it is necessary to adhere to the required radiation protection measures pursuant to the state of the art and to the ÖVE regulations (Austrian Association of Electrical Engineering) in operating the installation.

The installation is preferably operated continuously, with the raw solution running through chamber 1 with a speed of 17 l per hour.

The solution in anolyte chamber 7 consisting of demineralized water containing 1% chemically pure NaOH and being absolutely free of chlorine at the beginning of the trial, already after 2 minutes duration of the trial shows a chlorine content of 24.5 mg/l, an iodine content of 0.15 mg/l and a bromine content of 0.25 mg/l.

Verification of the halogen content of this solution is preferably carried out by way of spectrophotometry.

In said continuous performance of the process, a 4 to 8% by weight solution of sodium hydroxide is supplied through lines 16 and 17.

Anolyte or catholyte solution is continually replaced by the supply of approx. 8 weight percent sodium hydroxide solution at a ratio of approx. NaOH:halogen=1:1.

As shown in FIG. 1 the dialysis device is preferably a multi-chamber device. In certain cases, however, a simple dialysis device with only one chamber may well be sufficient.

Preferably, the dialysis device comprises at least one bipolar membrane.

Dialysis was carried out in the apparatus shown in FIG. 1 with a voltage of 30 to 200 Volt. Electric energy of approx. 21 W per kg of liquid to be treated is generated.

In the practical performance of the method the ionization and the dialysis are preferably carried out under pressure.

instead of the supply of a sodium hydroxide solution it is also possible to supply a saline solution such as a sodium salt solution.

Figure 2:
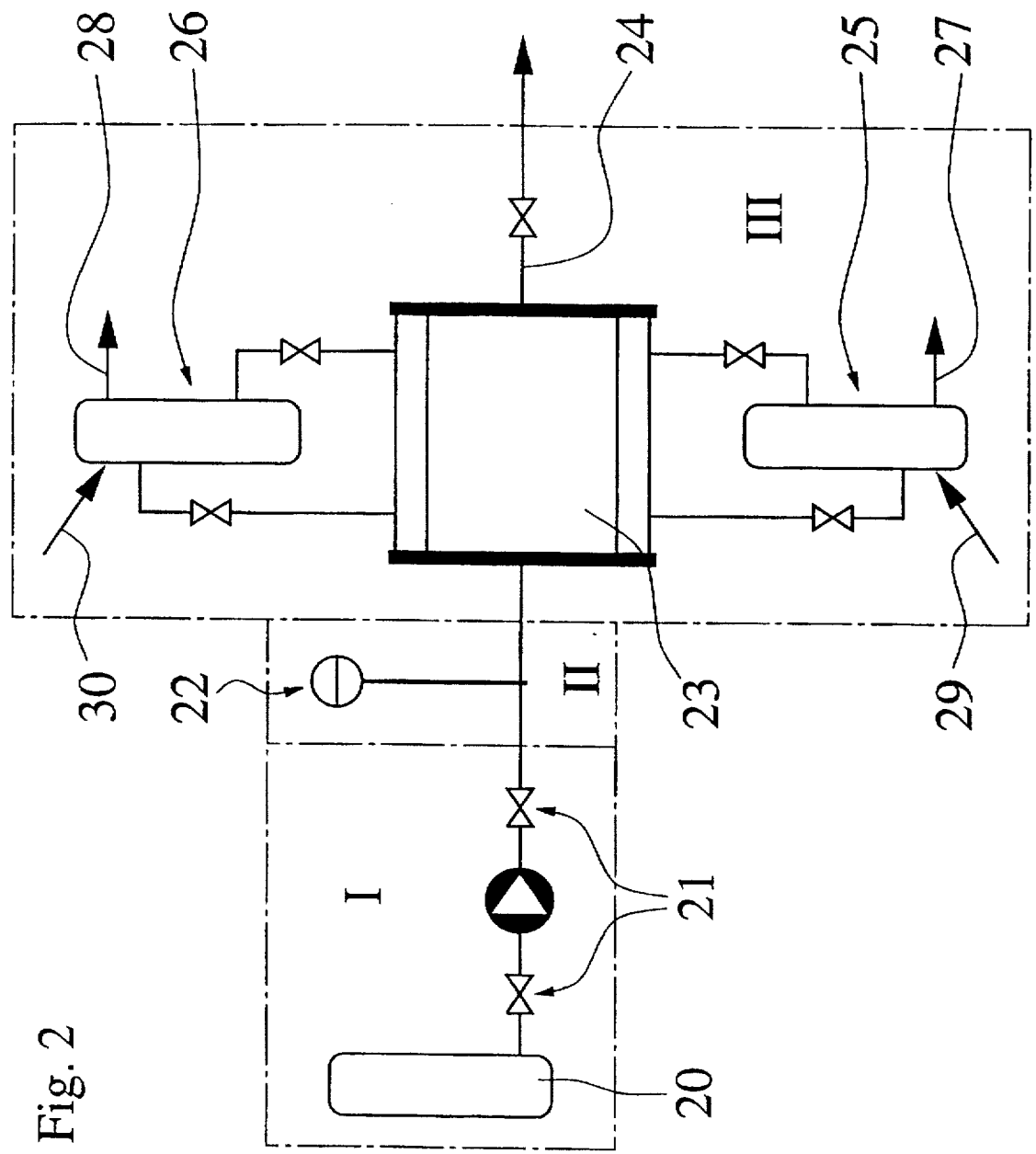
FIG. 2 shows the general arrangement of such a device within the entire installation used for this purpose and FIG. 3 shows a specific installation with a multi-chamber system for the electrodialysis.

FIG. 2 shows the entire installation in which there are arranged an ionization and a dialysis apparatus, which in this case are arranged separately from one another.

In installation part I the supply of the raw material mixture occurs from a tank 20 via a line 21 in which the required pumps and valves are provided.

As a result of the influence of the ionization device 22 in the ionization part II, the substance to be disposed of is split up and separated in the dialysis device.

The dialysis part III shows that the discharge of the organic substance occurs in the diluate from the dialysis apparatus 23 via line 24, while the discharge of the anorganic reaction products/concentrate occurs via circulations 25 and 26. In order to be capable to discharge these at 27 and 28 it is necessary to supply lines 29 and 30 with a caustic or saline solution.

Incompletely processed solutions can be recycled within the process.

Figure 3:
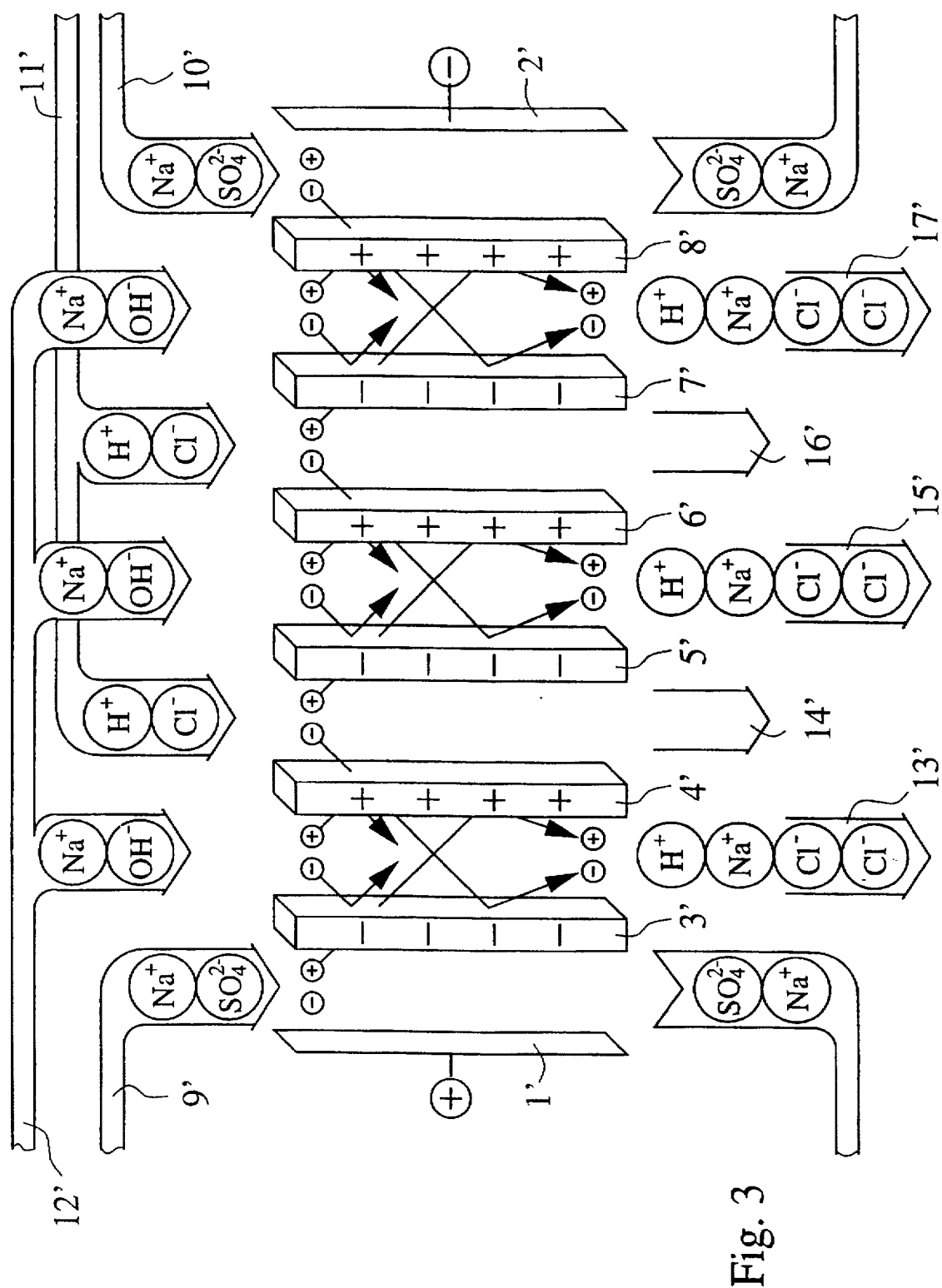

FIG. 3 shows a more sophisticated multi-chamber system in a schematic flow chart. It shows the principle of the ion flow which occurs within the installation. Recycled parts of the diluate, provided that the processing thereof was not yet complete, can be returned to the installation with the raw solution.

Membranes 3' to 8' are arranged between anode 1' and cation permeable 2', with membranes 3', 5' and 7' being cathode membranes and membranes 4', 6' and 8' being anion permeable membranes. Anolyte 9' and catholyte 10' are sodium sulphate solutions in this embodiment. An aqueous saline solution (e.g. NaCl, $Na_2SO_4$) or lye (e.g. NaOH) are supplied via line 11' as receiving solution, with concentrate being drawn off through lines 13', 15' and 17'.

The raw solution of the CFC, insecticide or herbicide is supplied at 12'. Diluate is drawn off through lines 14', 16' or returned to 12'.

Further details of performing the process are within the expertise of the ordinary man skilled in the art of electrodialysis and need not be explained herein in closer detail.

I claim:

1. A method for disposing of an organic halogen compound comprising carbon, hydrogen and oxygen, in atomic bond, which comprises the steps of
   (a) ionizing the compound to obtain ionization products,
   (b) splitting up the ionization products by electrodialysis to obtain ionic end products and residual organic substances, and
   (c) disposing of the ionic end products and residual organic substances.

2. The method of claim 1, wherein the ionic end products and residual organic substances are disposed in a landfill.

3. The method of claim 1, wherein the ionic end products and residual organic substances are disposed by incineration.

4. The method of claim 1, wherein the organic halogen compound is a compound which has a halogen bonded to an aromatic ring.

5. The method of claim 4, wherein the compound is a benzene derivative substituted by a halogen selected from the group consisting of chlorine, bromine and iodine.

6. The method of claim 5, wherein the benzene derivative is further substituted by at least from the group of from the group of hydroxyl, cyanide, alkyl, esterified carboxyl and carboxyalkene.

7. The method of claim 1, wherein the organic halogen compound is selected from the group consisting of dibromo hydroxybenzoic nitrile, diiodo hydroxybenzoic nitrile, chlorotolyl-2-oxopropanoic acid, and a mixture thereof.

8. The method of claim 1, wherein the organic halogen compound is a halogenated polyphenyl.

9. The method of claim 1, wherein the organic halogen compound is an aliphatic halogen compound.

10. The method of claim 1, wherein the organic halogen compound is ionized by X-rays.

11. The method of claim 10, wherein the organic halogen compound is ionized by X-rays in combination with beta and gamma rays.

12. The method of claim 1, wherein the organic halogen compound is ionized in liquid condition.

13. The method of claim 12, wherein the organic halogen compound is ionized in an aqueous solution.

14. The method of claim 12, wherein the organic halogen compound is ionized until a minimum conductivity of 500 μm (micromho) is obtained.

15. The method of claim 14, wherein an alkali metal hydroxide or an alkali metal salt is added to the liquid organic halogen compound to increase the conductivity.

16. The method of claim 1, wherein the electrodialysis is carried out with a voltage of 30 to 200 V.

17. The method of claim 1, wherein the organic halogen compound is ionized and split up under pressure.

18. The method of claim 1, wherein the organic halogen compound comprises at least one additional element of the group consisting of phosphorus, sulfur and a metal.

19. An apparatus for disposing of an organic halogen compound comprising phosphorus and at least one element selected from the group consisting of sulfur and a metal, in addition to carbon, hydrogen and oxygen, in atomic bond, which comprises (a) a device for ionizing the compound to obtain ionization products, and (b) an electrodialysis device for splitting up the ionization products to obtain ionic end products and residual organic substances, (1) the ionizing and electrodialysis devices being closely spaced in an integrated unit.

20. The apparatus of claim 19, wherein the ionizing device comprises a common X-ray machine from which aluminum plates inserted for screening off beta and gamma radiation have been removed.

21. The apparatus of claim 19, wherein the electrodialysis device comprises a plurality of chambers.

22. The apparatus of claim 21, comprising at least one bipolar membrane separating respective ones of the chambers.

23. The apparatus of claim 19, wherein the ionizing device comprises a central chamber; the electrodialysis device comprises an anode, an anolyte chamber adjacent one side of the central chamber, a membrane separating the central and anolyte chambers, an anode chamber between the anolyte chamber and the anode, and a membrane separating the anolyte and anode chambers, a cathode, a catholyte chamber adjacent a side of the central chamber opposite the one side, a membrane separating the central and catholyte chambers, a cathode chamber between the catholyte chamber and the cathode, and a membrane separating the catholyte and cathode chambers; a supply line for feeding the organic halogen compound to the central chamber; feed lines for feeding an alkali metal hydroxide or alkali metal saline solution to the anolyte, anode, catholyte and cathode chambers; a discharge line for discharging the ionic end products from the central chamber; and discharge lines for discharging concentrate from the anolyte and catholyte chambers.

* * * * *